United States Patent
Jacobsen et al.

(10) Patent No.: US 7,949,648 B2
(45) Date of Patent: May 24, 2011

(54) COMPILING AND ACCESSING SUBJECT-SPECIFIC INFORMATION FROM A COMPUTER NETWORK

(75) Inventors: Brian Jacobsen, Vanlose (DK); Søren Alain Mortensen, Copenhagen W (DK)

(73) Assignee: Soren Alain Mortensen, Valby (DK)

( * ) Notice: Subject to any disclaimer, the term of this patent is extended or adjusted under 35 U.S.C. 154(b) by 367 days.

(21) Appl. No.: 10/082,354

(22) Filed: Feb. 26, 2002

(65) Prior Publication Data
US 2003/0163454 A1    Aug. 28, 2003

(51) Int. Cl.
G06F 7/00    (2006.01)
G06F 17/30    (2006.01)

(52) U.S. Cl. .................................................. 707/710
(58) Field of Classification Search ............... 707/5, 3; 709/224
See application file for complete search history.

(56) References Cited

U.S. PATENT DOCUMENTS

| | | | | |
|---|---|---|---|---|
| 6,021,409 | A * | 2/2000 | Burrows ................... | 707/102 |
| 6,029,165 | A * | 2/2000 | Gable ....................... | 707/3 |
| 6,175,830 | B1 | 1/2001 | Maynard | |
| 6,178,419 | B1 * | 1/2001 | Legh-Smith et al. ....... | 707/3 |
| 6,289,342 | B1 * | 9/2001 | Lawrence et al. .......... | 707/7 |
| 6,304,864 | B1 * | 10/2001 | Liddy et al. ............... | 706/15 |
| 6,349,307 | B1 * | 2/2002 | Chen ........................ | 707/103 X |
| 6,363,378 | B1 * | 3/2002 | Conklin et al. ............ | 707/5 |
| 6,430,558 | B1 * | 8/2002 | Delano ...................... | 707/5 |
| 6,584,468 | B1 * | 6/2003 | Gabriel et al. ............. | 707/10 |
| 6,629,138 | B1 * | 9/2003 | Lambert et al. ............ | 709/224 |
| 6,636,848 | B1 * | 10/2003 | Aridor et al. .............. | 707/3 |
| 6,647,383 | B1 * | 11/2003 | August et al. ............. | 707/3 |
| 6,665,659 | B1 * | 12/2003 | Logan ....................... | 707/3 |
| 6,963,867 | B2 * | 11/2005 | Ford et al. ................. | 707/3 |
| 6,965,900 | B2 * | 11/2005 | Srinivasa et al. .......... | 707/3 |
| 7,096,220 | B1 * | 8/2006 | Seibel et al. ............... | 707/3 |
| 7,117,199 | B2 * | 10/2006 | Frank et al. ............... | 707/3 |
| 7,599,911 | B2 | 10/2009 | Manber et al. | |
| 2001/0037324 | A1 | 11/2001 | Agrawal et al. | |
| 2002/0016786 | A1 * | 2/2002 | Pitkow et al. ............. | 707/3 |
| 2002/0129014 | A1 * | 9/2002 | Kim et al. ................. | 707/5 |
| 2003/0046311 | A1 * | 3/2003 | Baidya et al. ............. | 707/200 |
| 2003/0061232 | A1 * | 3/2003 | Patterson .................. | 707/104.1 |
| 2003/0172050 | A1 * | 9/2003 | Decime et al. ............ | 707/1 |

(Continued)

FOREIGN PATENT DOCUMENTS

EP    1 341 099    10/2009

OTHER PUBLICATIONS

Jeonghee Yi & Neel Sundaresan. Metadata Based Web Mining for Relevance. IEEE 2000.*

(Continued)

*Primary Examiner* — Michael J Hicks
(74) *Attorney, Agent, or Firm* — Connolly Bove Lodge & Hutz LLP

(57) ABSTRACT

A subject-specific search engine utilizes a smart web crawler and includes a capability of filtering out sites not relevant to the particular subject. As the smart crawler traverses the Internet, sites are filtered, and only sites found relevant are indexed and stored in a database for later searching. Sites may be filtered an arbitrary number of times for relevance, and such filtering may, for example, comprise automated, lexicon-based filtering; manual filtering, using a human editor; or both.

26 Claims, 14 Drawing Sheets

U.S. PATENT DOCUMENTS

2004/0181389 A1* 9/2004 Bourigault et al. ............... 704/1
2006/0004731 A1* 1/2006 Seibel et al. ...................... 707/3

OTHER PUBLICATIONS

Zheng et al. Specialized Search in Linguistics and Languages. Computational Linguistics Dept. Saarland University, Germany. CIC Jun. 2002.*

Dempsey et al. Design and empirical evaluation of search software for legal professionals on WWW. Elsevier Science Ltd. 2000.*

Menczer et al. Evaluating Topic-Driven Web Crawlers. ACM Sep. 2001.*

Compiling Document Collections from the Internet. V. Kluev. The Core and Information Technology Center. The University of Aizu. Journal Title: SIGIR Forum. Date: 2001.*

E-Medicine Year : 2000 | vol. 46 | Issue : 2 | p. 116-22. Information retrieval in medicine: overview and applications. Nadkarni P M.*

L. Zamburru, D. Genovese. BOTH: Cooperative Automatic Web Navigation and Hierarchical Filtering. AusWeb96 The Second Australian WorldWideWeb Conference. © 1996.*

Joachim Hammer, Jan Fiedler. Using Mobile Crawlers to Search the Web Efficiently. pp. 36-58, 2000.*

Filippo Menczer, Gautam Pant, Padmini Srinivasan, Miguel E. Ruiz. Evaluating Topic-Driven Web Crawlers (2001).*

Diligenti et al. , "Focused Crawling Using Context Graphs", 26th International Conference on Very Large Databases, pp. 527-534, VLDB 2000.*

Menczer et al., "Adaptive Information Agents in Distributed Textual Environments", Proc. 2nd International Conference on Autonomous Agents, pp. 157-164, 1998.*

S. Chakrabarti et al., "Focused Crawling: A New Approach to Topic-Specific Web Resource Discovery," WWW8 Conference, 1999.

Google, Inc., "Our Search: Google Technology," http://www.google.com/technology/, downloaded Jun. 12, 2002.

Google, Inc., "Google Features," http://www.google.com/help/features.html, downloaded Jun. 12, 2002.

Google, Inc., "Google's New GoogleScout Feature Expands Scope of Search on the Internet," Google Press Release, Sep. 21, 1999.

S. Chakrabarti et al., "Focused Crawling: A New Approach to Topic-Specific Web Resource Discovery," WWW8 Conference, 1999.

M. Hersovici et al., "The Shark-Search Algorithm. An Application: Tailored Web Site Mapping," Computer Networks and ISDN Systems, North Holland Publishing, vol. 30, No. 1-7, Apr. 1, 1998.

J. Cho et al., "Efficient Crawling Through URL Ordering," Computer Networks and ISDN Systems, North Holland Publishing, vol. 30, No. 1-7, Apr. 1, 1998.

Health on the Net Foundation, "HON Projects and initiatives: M.A.R.V.I.N.—Multi-Agent Retrieval Vagabond on Information Networks," available at http://www.hon.ch/Project/Marvin_project.html and http://www.hon.ch/Project/Marvin_specificities.html, web sites last modified Apr. 30, 2002.

Chakrabarti, et al., "Focused crawling: a new approach to topic-specific Web resource discovery," *Computer Networks*, vol. 31, pp. 1623-1640 (1999).

Cho, et al., "Efficient crawling through URL ordering," *Computer Networks and ISDN Systems*, vol. 30, pp. 161-172 (1998).

Hersovici, et al., "The shark-search algorithm. An application: tailored Web site mapping," *Computer Networks and ISDN Systems*, vol. 30, pp. 317-326 (1998).

European Patent Office Search Report, dated Apr. 16, 2004, issued in connection with counterpart European Application No. 03250903.6-1527.

* cited by examiner

COMPILING AND ACCESSING SUBJECT-SPECIFIC INFORMATION FROM A COMPUTER NETWORK

BACKGROUND OF THE INVENTION

1. Field of the Invention

The present invention is directed to the general field of systems, methods, and computer program products for performing Internet-based searching. In particular, it deals with a search engine tailored to search the Internet and to return results that contain fewer irrelevant results than present search engines return.

2. Related Art

It has been said that the Internet/network communities are what are pushing the economy forward these days, and it is a fact, that the Internet contains unprecedented volumes of information on just about any topic. The only problem is to find the truly relevant resources. Search engines are what make the Internet useful, because without these tools the chances of finding relevant resources would be significantly diminished. Thus, while the Internet drives the economy, search engines drive the Internet. This is backed by statistics made on users' use of the Internet, which shows that users spend more online time at search engines than anywhere else, including portals.

Yet current search engine technology often leaves one dissatisfied and frustrated, particularly where one would like to find resources on a given subject in a specific context. For example, suppose that a user would like to find information on the Ford Pinto in a legal context (referring to the product liability cases against Ford due to defects in the Ford Pinto models design). A general purpose search engine (GPSE) will typically return numerous irrelevant links if one searches on the term "Pinto," simply because a GPSE can not recognize a context or a specific subject, e.g. a legal context or law as a subject. This is so due to the fact that GPSEs adopt the strategy of "everything is relevant;" therefore, they try to collect and index all pages on the Internet. Their operations are based on this unedited collection of pages.

To gain more insight into the workings of GPSEs, it is first worth noting that the term "search engine" is typically used to cover several different types of search facilities. In particular, "search engines" may be broken up into four main categories: robots/crawlers; metacrawlers; catalogs with search facilities; and catalogs or link collections.

FIG. 1A illustrates the operation of robots/crawlers. These are characterized by having a process (i.e., a crawler) that traverses the Internet 1, as indicated by arrow 4, on a site-by-site basis and sends back to its host machine 2 the contents of each home page it encounters at various sites 3 on its way, as indicated by arrows 5. Then, as shown in FIG. 1B, the host machine 2 indexes the pages 8 sent back by crawler 7 and files the information in its database 9. Any front-end query looks up the search terms in the information stored in the host's database 9. Existing crawlers generally consider all information to be relevant, and therefore, all home pages on all sites traversed are indexed. Examples of such robots/crawlers include Google™, Altavista™, and Hotbot™.

Metacrawlers, as illustrated in FIG. 2, are characterized in that they offer the possibility of searching in a single search facility 2 and obtaining replies from multiple search facilities 10. The metacrawler serves as a front end to several other facilities 10 and does not have its own "back end." Metacrawlers are limited by the quality of the information in the search facilities that they employ. Examples of such metacrawlers include MetaCrawler™, LawCrawler™, and LawRunner™.

Catalogs, with or without search facilities, are characterized in that they are collections of links structured and organized by hand. In the case of a catalog with a search indexed depends on the particular GPSE. A user can enter a query into the front-end, and the GPSE will search the indexed pages. This procedure is based on the principle of "everything is relevant," meaning that the crawler will get and save every page it encounters. Similarly every page saved in memory by the crawler will be indexed. This typical operation of a GPSE is illustrated in FIGS. 1A and 1B, as discussed above (indexing part not shown).

SUMMARY OF THE INVENTION

The present engine takes the form of a subject specific search engine (SSSE), where the strategy adopted is to collect and index only the pages deemed relevant for a specific subject, e.g., law or medicine. The way this is done, in one embodiment of the invention, is through a lexicographic analysis of the texts used by the profession or area of interest. The inventive technology is able to differentiate among contexts and to thus provide a given profession with a search engine that returns only links to relevant resources, i.e., resources the contents of which contain a query term in the desired context. Drawing from the "Pinto" example discussed above, a search for "Pinto" in a legal search engine according to the present invention will thus only return results where the query term "Pinto" appears in a legal context. Put another way, it will return only legal documents or legally relevant documents containing the term "Pinto".

To further understand the advantages of an SSSE according to the invention over GPSEs, consider the following scenario:

Imagine a public library that keeps all of its books in a huge pile. Suppose an attorney needs to find some information about the product liability case brought against Ford for their design faults in the Pinto model.

Now imagine that the attorney goes to the public library. In this public library all the books are placed in the back, and in order to retrieve any books one must approach a librarian and tell her which word one is looking for. In this case the attorney is looking for "Pinto." In less than a second the librarian is back and places 460,000 books in front of the attorney. Depending on the public library these books may not be ordered at all, ordered by the number of times the word "Pinto" appears in each book, or by other people's references to each book.

To find a book covering the Pinto case, suppose that the attorney starts looking at the title of each book, and if it seems interesting he reads the back cover. It will not be long before he finds himself reading about Pinto horses, families having Pinto as a surname, the El Pinto restaurant, etc. Once in a while he will find a book that actually is about the Ford Pinto case. If he has the patience and the time, he will find the type of book he is looking for somewhere along the line. If he is able to scan through the books at a rate of one book per second, he will be finished in approximately five and a half days. The end result may be some 500 books.

To avoid this, the attorney currently has two choices:
    He can use Boolean algebra, if he is familiar with it, by changing the query to something like '"Ford Pinto" AND ("product liability" OR "punitive damages").' To ensure that he gets all the relevant books, he should also enter all kinds of legal terms (the U.S. legal terminology consists of approximately 20,000 terms).

He can find the "legal librarian" (or, in Internet terms, a metacrawler, like LawRunner.com or LawCrawler.com). The legal librarian does some of the work that the attorney must do in the preceding option, that is, the librarian makes sure that both the original word, "Pinto," and either the word "legal" or the word "law" is in the books that the librarian returns. It might, however, seem a bit inadequate to get only two terms out of the 20,000 terms mentioned above (i.e., without entering the rest manually).

The attorney may, however, have a third option, a specialized library (for example, a university department's library, like a law school library or an engineering school library). A specialized library is a library specializing in one subject; in the present example, the appropriate library would be a law library. If the attorney were to ask the librarian here, the "Pinto" query would result in, perhaps, 500 books. The key here is that, before any book is placed in the specialized library, it has been classified as relevant in the library's particular context. That is, someone actually sat down, looked through the book, and decided that it contained relevant material. As a result, in the present example, all the books about Pinto horses, families, and the like, never make it into this library, thus eliminating the hassle of ignoring them.

The inventive SSSE draws upon some of the concepts of this third option. In particular, the inventive SSSE provides a particular profession (or more generally, special interest group) with a search engine that returns only links to resources that contain components of the profession's terminology.

The inventive SSSE starts with the principle that not all pages or even sites are relevant. If one is building an SSSE for United States law, pages from sites like www.games.com and www.mp3.com are generally not relevant. A human would "know" that a site with the name www.games.com is not likely to contain pages with a relevant content for the legal profession. The question then is how to make a computer system "know."

In an SSSE according to an embodiment of the present invention, a first feature is that the crawler may perform filtering and indexing, in addition to merely finding information. This means that the crawler is now "aware" of the analysis of each web page and can act accordingly.

A second feature of an SSSE according to an embodiment of the present invention is the addition of a new field in the database containing the information stored by the crawler. This field holds a parameter referred to as the "depth." The depth is the number of preceding pages that were traversed and were deemed not relevant.

A third feature of an SSSE according to an embodiment of the present invention is the setting of a threshold for how deep the crawler will be permitted to crawl down a branch before it is stopped. That is, how many irrelevant pages in a row will be allowed before the branch may be considered entirely irrelevant.

In one embodiment of the invention, the crawler is designed so as to filter each site it traverses using a database of relevant terminology. In another embodiment of the invention, the information is sent to the host, and all analyzing processes are left to the host computer running the crawler. The web page corresponding to each site that is passed through the filter and deemed preliminarily relevant may then be filtered one or more additional times. Filtering may be performed either automatically or in conjunction with a human. In the case of automatic filtering, the additional filtering may be performed either as part of the crawler or as a process running on a host computer. Pages that are passed through as many filtering stages as are present and are deemed relevant are then indexed and stored in a database.

To provide users with ease in retrieving the most relevant information, an embodiment of the invention utilizes a ranking system for determining which pages are most relevant. The ranking system is based on the computation and storage of word rankings and the computation of site (page) rankings, based on the word rankings, in response to user queries. Rankings are then used to display the sites retrieved in the search in accordance with their rankings, so as to give display priority to the most relevant sites.

Also for the sake of user-friendliness, an embodiment of the invention utilizes a hierarchical display system. For example, all pages linked to from a given page may be displayed indented under the main page's URL. Such a display may be implemented in collapsible/expandable form. As discussed above, display may take into account site rankings.

The invention may be embodied in the form of a method, system, and computer program product (i.e., on a computer-readable medium).

DEFINITIONS OF TERMS

In describing the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Memory" refers to any medium used for storing data accessible by a computer. Examples include all the examples listed above under the definition of "computer-readable medium."

"Software" refers to prescribed rules to operate a computer. Examples of software include software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links, or both. Examples of a network include an internet, such as the Internet; an intranet; a local area network (LAN); a wide area network (WAN); and a combination of networks, such as an internet and an intranet.

BRIEF DESCRIPTION OF THE DRAWINGS

Embodiments of the invention will now be described with reference to the attached drawings in which.

DESCRIPTION OF EMBODIMENTS OF THE INVENTION

Figure 1A:
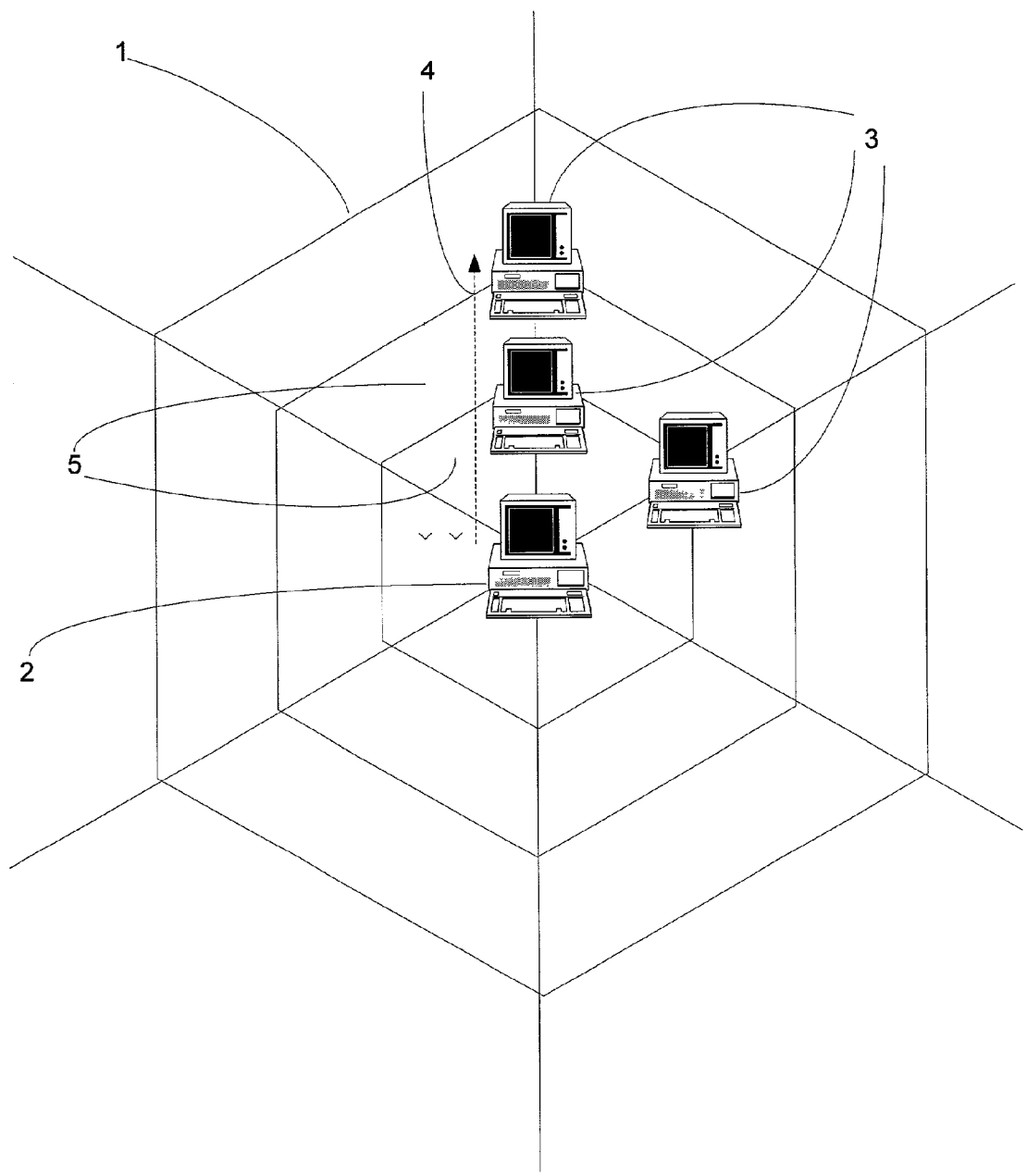
FIGS. 1A and 1B together illustrate the operation of a typical prior-art GPSE, and FIG. 1A also partially illustrates the operation of a crawler according to an embodiment of the present invention.
Figure 1B:
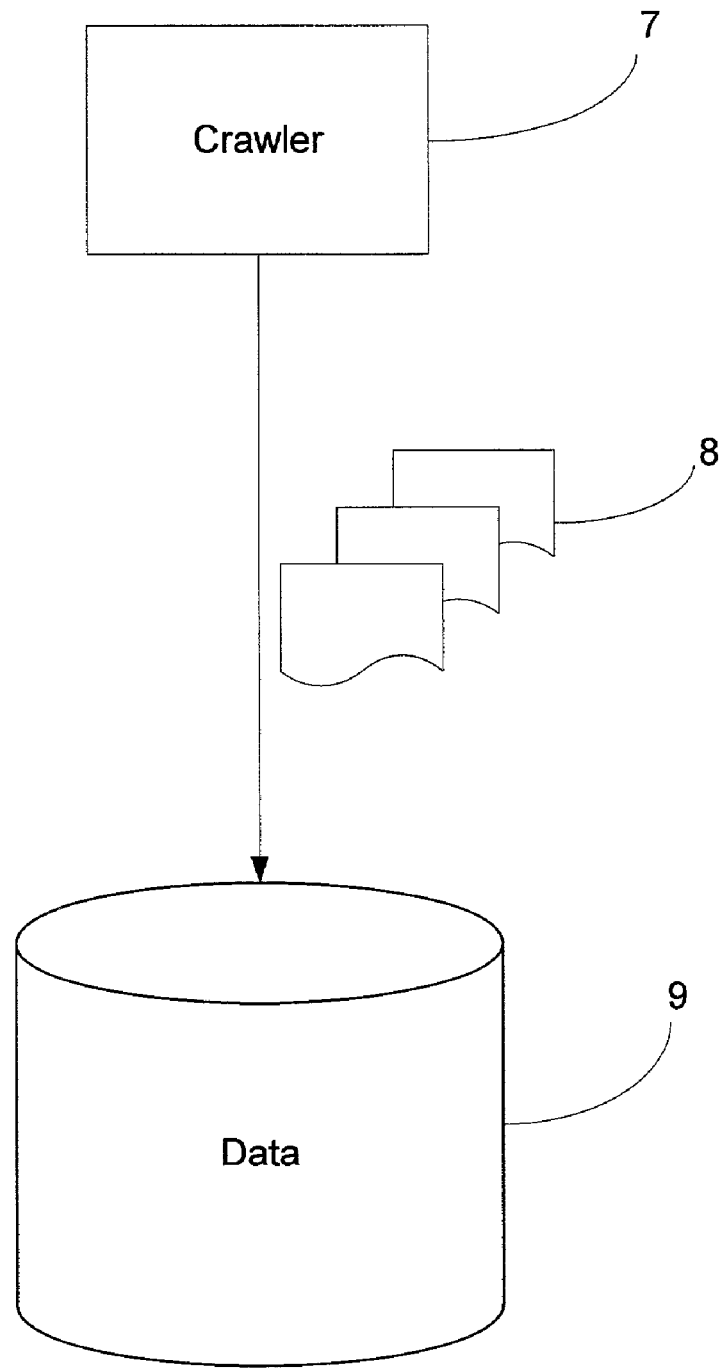
Figure 2:
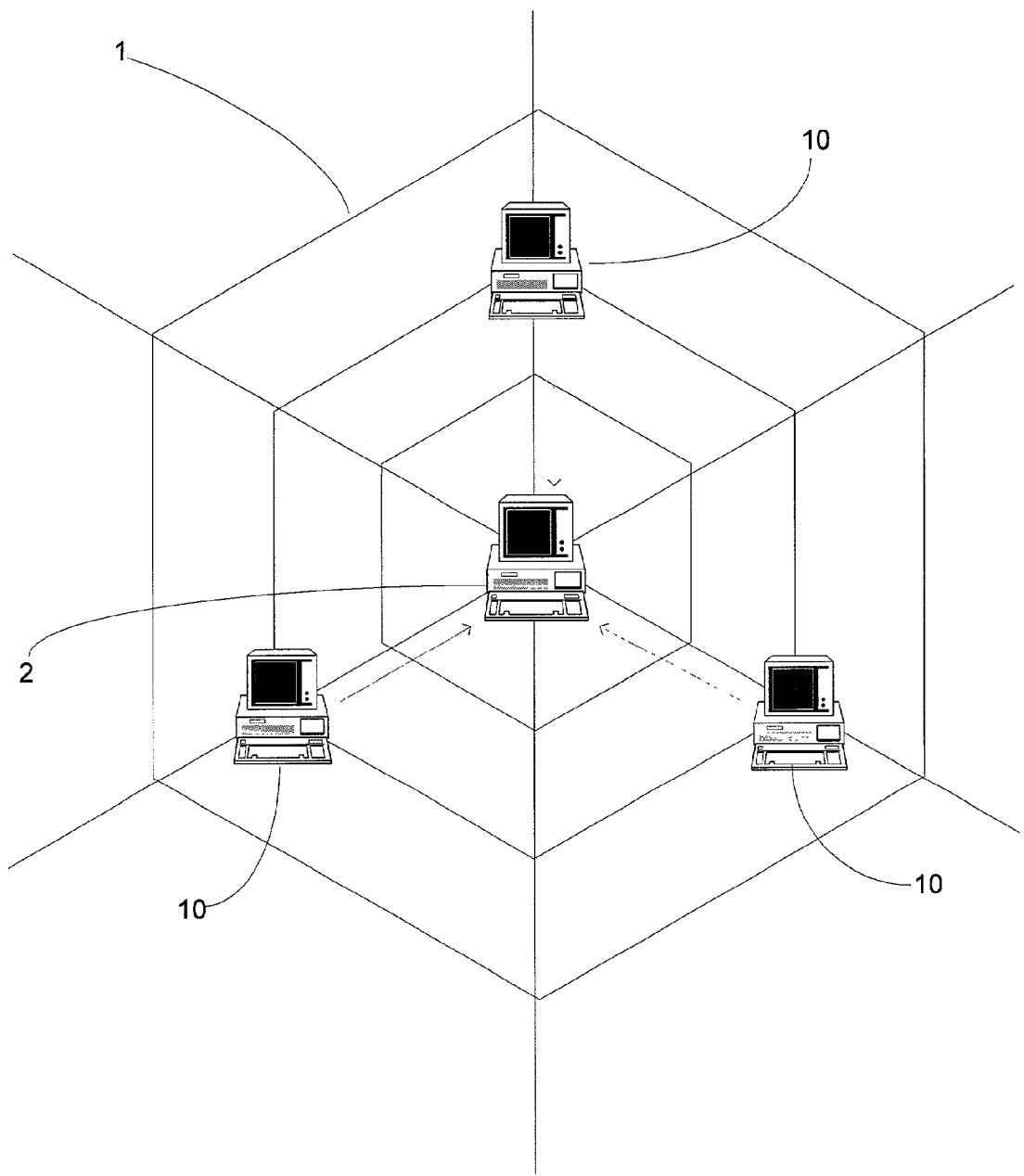
FIG. 2 illustrates the operation of a typical prior-art metacrawler.
Figure 4:
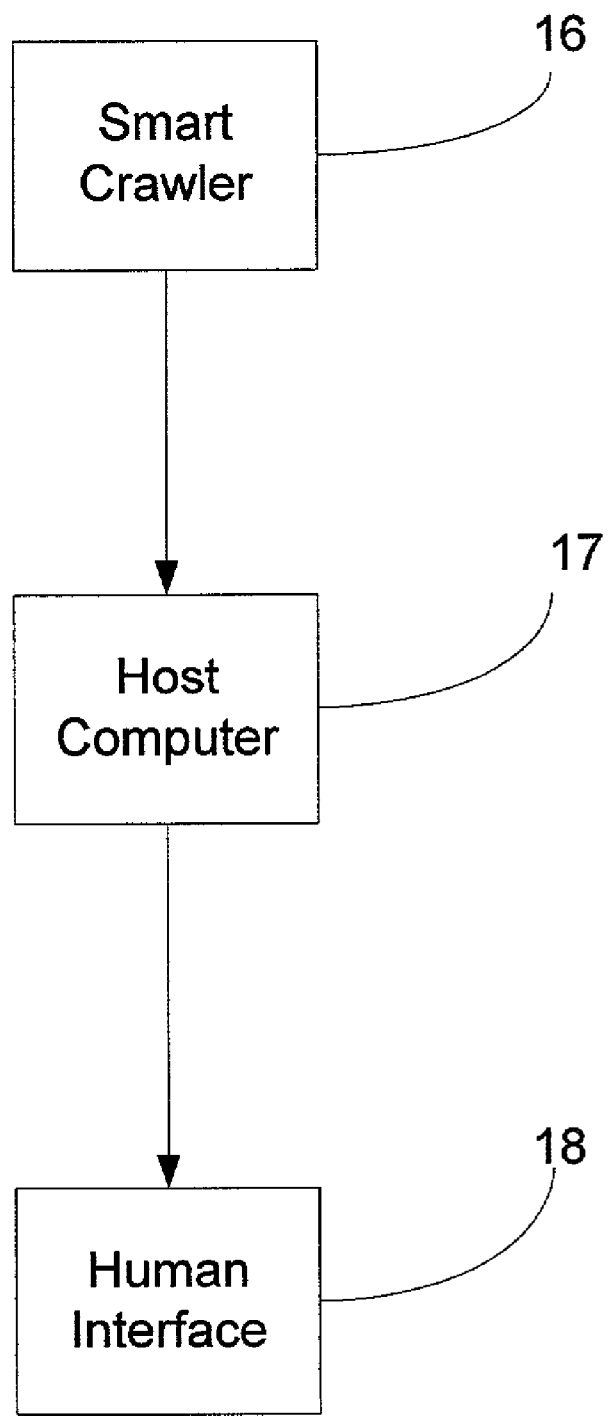
FIG. 4 illustrates a configuration according to an embodiment of the present invention.

The general structure of an embodiment of an SSSE according to the invention is shown in FIG. 4. As shown, there are three primary components in the SSSE: smart crawler 16, host computer 17, and human interface 18. Smart crawler 16 operates, for the most part, as shown in FIG. 1A (that is, similar to prior-art crawler programs); however, there are additional features that differentiate the inventive smart crawler from prior-art crawlers discussed above. As is the case with typical GPSEs, as discussed above, the crawler, in this case smart crawler 16, transmits information back to host computer 17; this is similar to host machine 2 in FIG. 1A, but it may also perform additional processes. Finally, human interface 18 is provided for entering search queries and for, in some embodiments, human interaction in the processes of information screening and indexing. The roles of these components will become clearer in view of the discussion below explaining the operation of the inventive SSSE.

Figure 3A:
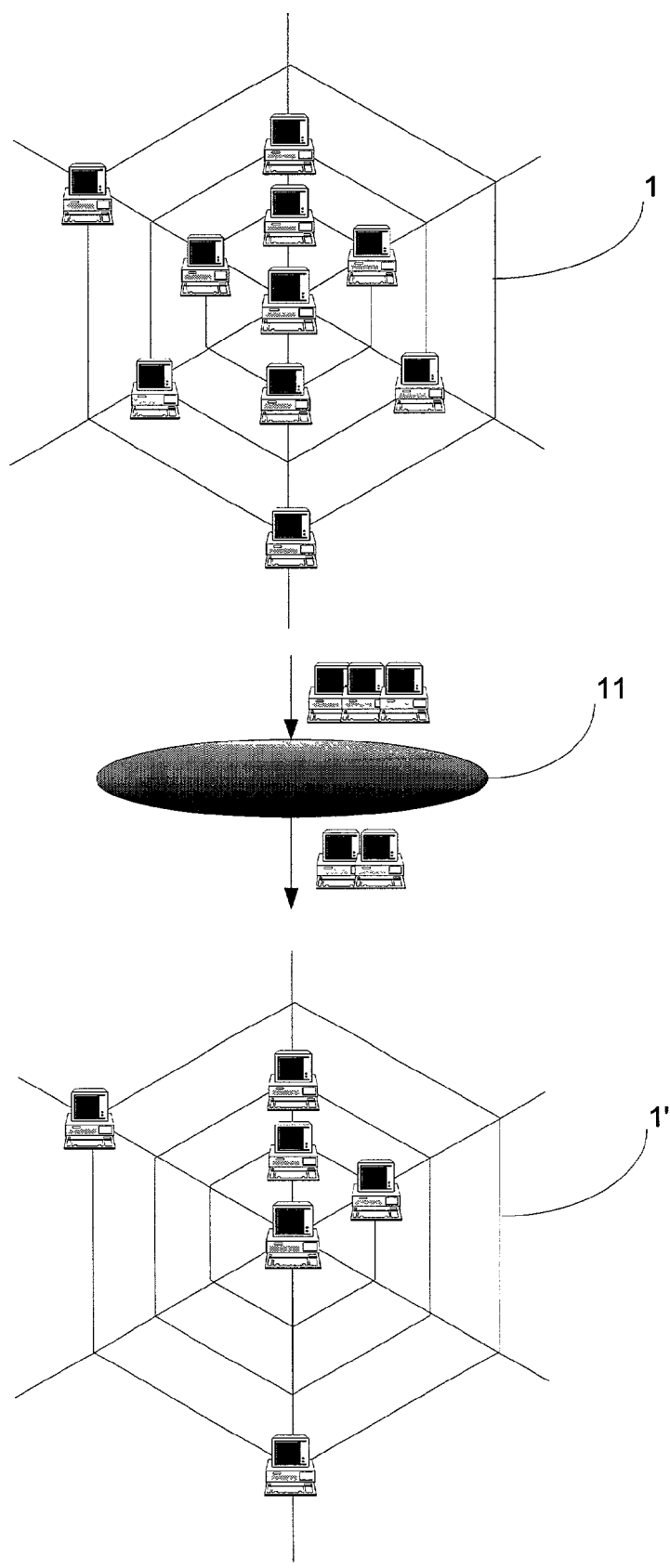
FIGS. 3A and 3B illustrate, along with FIG. 1A, the operation of an embodiment of an SSSE according to the present invention.

As explained above, in one embodiment smart crawler 16 operates in basically the same way as prior-art crawlers, i.e., by visiting sites and transmitting information back to host computer 17. However, unlike prior-art crawlers, in this embodiment smart crawler 16 does not operate under the "everything is relevant" principle; rather, it operates as shown in FIG. 3A. In FIG. 3A, smart crawler 16 traverses the Internet 1 and then performs a screening operation, denoted by site filter 11. Site filter 11 determines, based on terminology of the profession to which the SSSE is directed (e.g., law), whether or not each site is considered to be relevant to the profession. The result is that some sites are filtered out, leaving, essentially, an Internet 1' containing only relevant sites. It is only the information on relevant sites that is transmitted to host computer 17 in this embodiment. At host computer 17, the information on relevant sites, as determined by site filter 11, may be stored in memory (not shown) for further processing, or it may be indexed and stored in a database. Filter 11 may be implemented in either automated form or in a form requiring human interaction.

In another embodiment the filtering capabilities may be implemented solely in the host computer 17. In this case, smart crawler 16 returns all site information to host computer 17 for screening, and host computer 17 makes all determinations as to whether or not sites are relevant and as to when links to sites should be traversed or not. As in the case of the previous embodiment, filtering may be automated or manual (e.g., human editing).

Figure 3B:
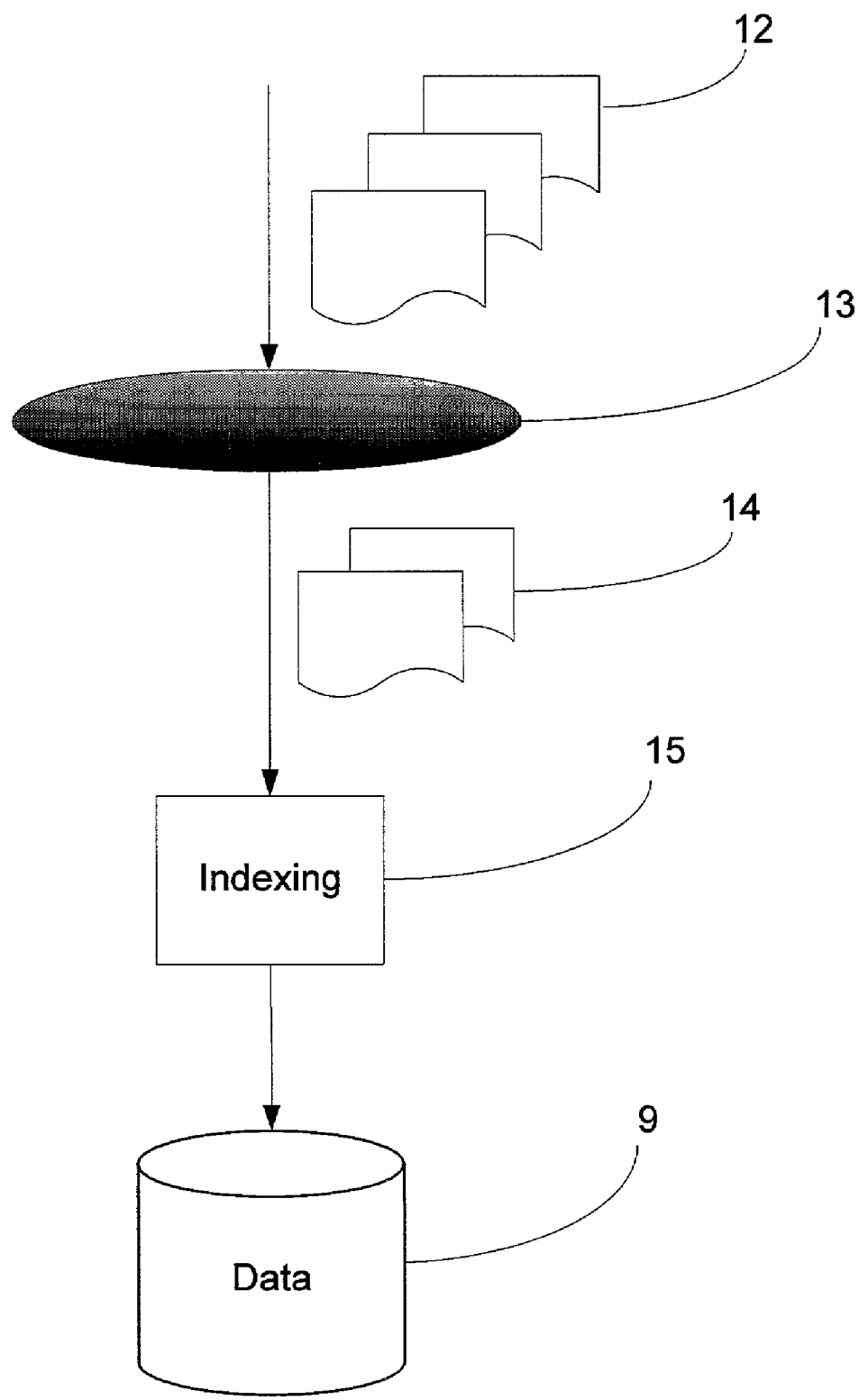

FIG. 3B reflects further steps that may be carried out in some embodiments of the process carried out by the inventive SSSE. In such embodiments, there is at least one additional level of filtering 13, which may be carried out either as part of smart crawler 16 or as a separate process in host computer 17. As shown, the information (web page) 12 of each site found relevant in the process shown in FIG. 3A may be screened at least a second time, by filter 13, which again screens the terminology found in the site information (in the case of a manual implementation, a human may also be able to account for additional site information, like the name of the site and the "overall feel" of the site). Only information 14 that passes through this second filter 13 is then indexed 15 and stored in database 9.

Therefore, in general, each site stored in the SSSE passes through one or more layers of screening, each of which may be implemented in automated or manual form. In one exemplary embodiment, two automated filters are followed by human screening prior to indexing.

As discussed above, filter 13 acts to filter out irrelevant web pages (and similarly with any additional filters, if present). The pages that are filtered out are discarded, and no links to such pages are traversed. Thereafter, if the smart crawler encounters a link to a discarded page, it simply ignores it.

The strategy of using both a smart crawler having automated filtering and human editing in some embodiments of the invention combines the best of two worlds: the speed of the machine and the reasoning of man. The machine suggests a number of sites, the editor approves or discards the sites, and the machine indexes the relevant pages on the approved sites. Based on links from the approved sites, the smart crawler may suggest more sites, etc., resulting in an evolution of the search engine.

Figure 5A:
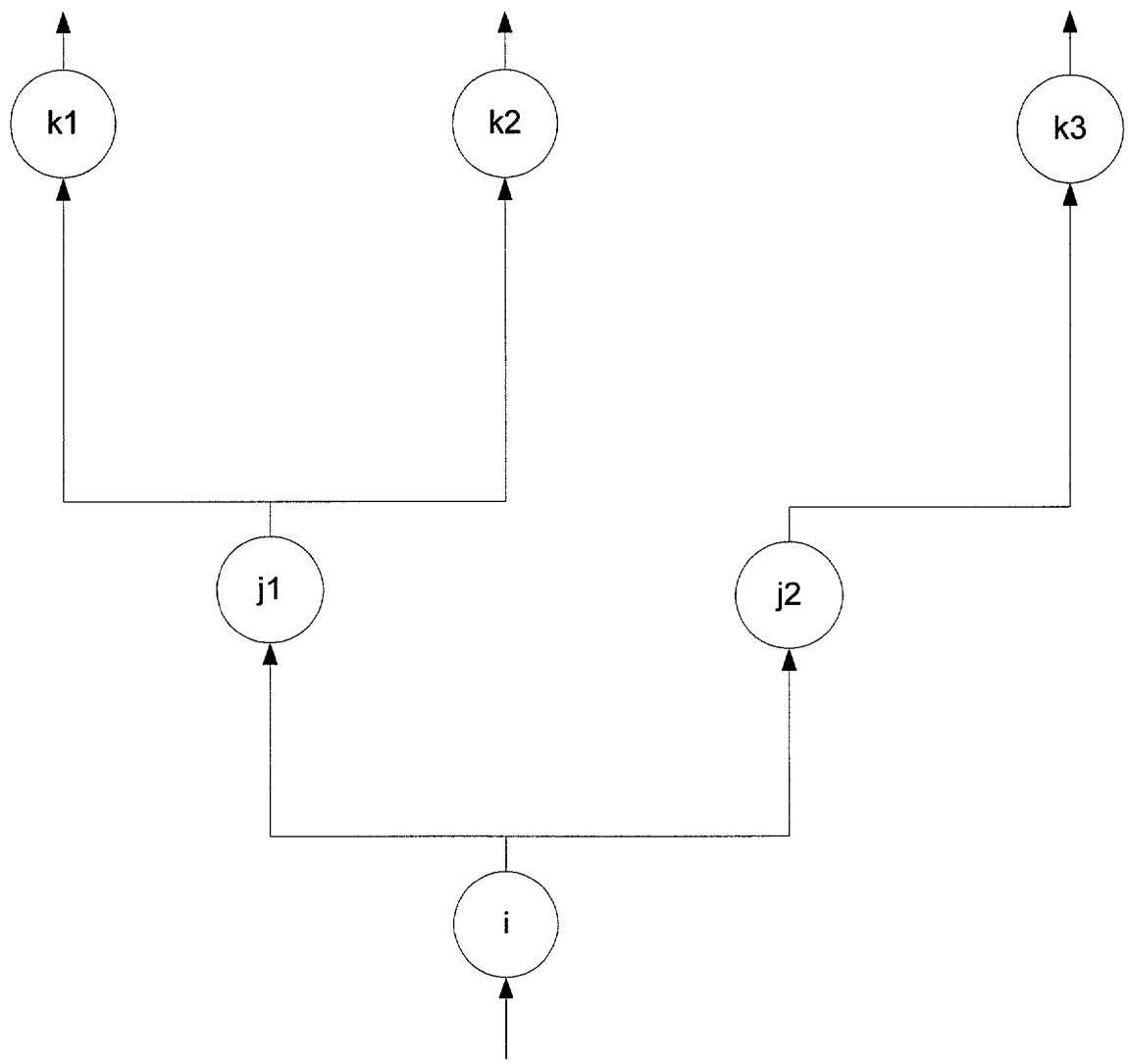
FIGS. 5A and 5B illustrate a depth monitoring process according to an embodiment of the invention.
Figure 5B:
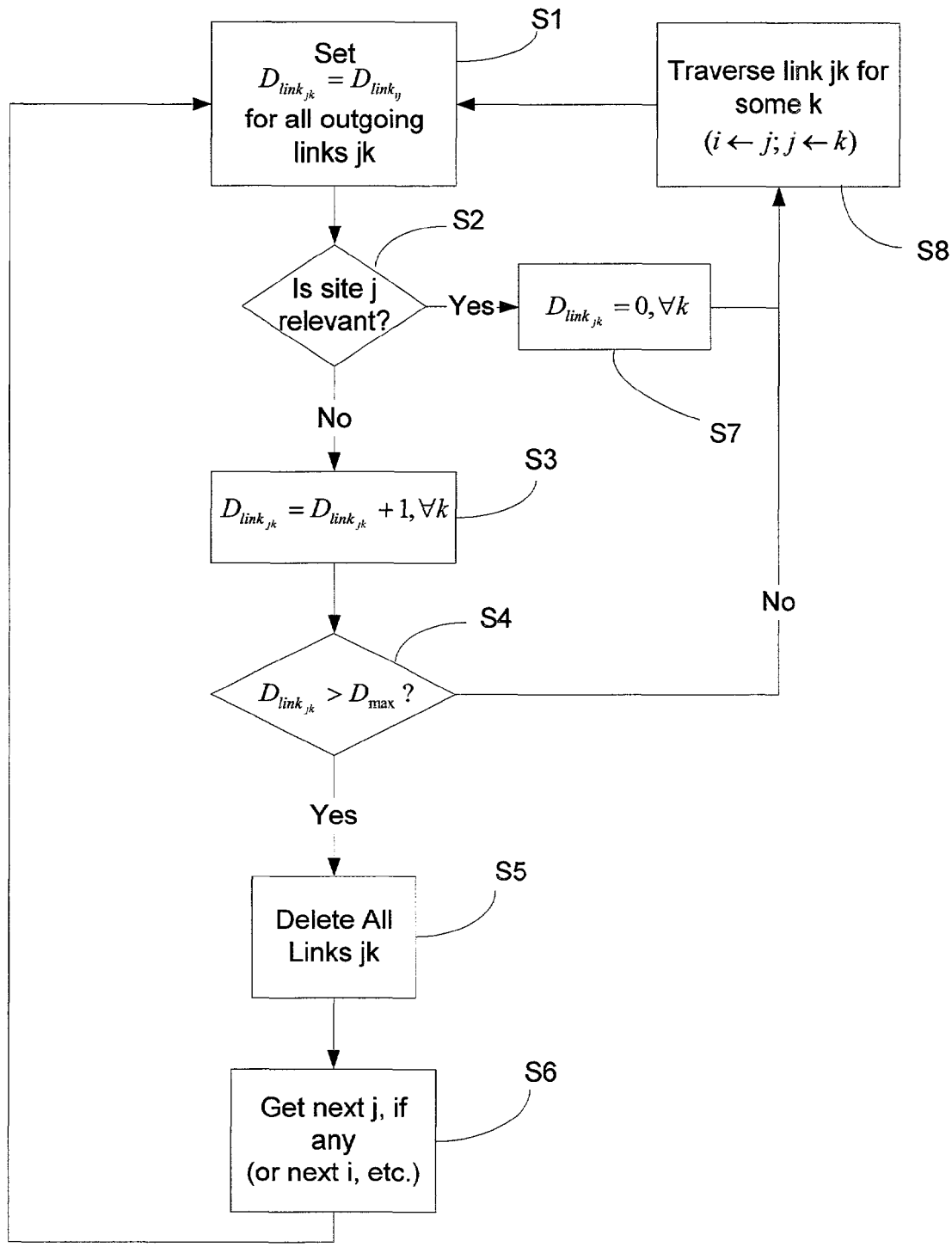

A further difference between an embodiment of the inventive smart crawler and prior-art crawlers lies in the use of a "depth monitoring system" in connection with determining whether or not sites should even be visited. FIGS. 5A and 5B will be used to describe such a depth monitoring system, according to an embodiment of the invention.

FIG. 5A depicts a "chunk" of the Internet and will be used as an aid in explaining FIG. 5B. FIG. 5A depicts a hierarchy of three levels: i, j, and k. Each level has at least one site. Additionally, links between sites will be referred to below as "$link_{xy}$," where "xy" designates the fact that the link is from site x to site y. Note that the Internet, when viewed on a larger scale, is generally not a hierarchy; however, on a small scale, as depicted, it can be viewed as such. In any event, the inventive system is applicable to the Internet, in general.

FIG. 5B gives a flowchart demonstrating the operation of the inventive depth monitoring system. Assume that site i has already been visited and that a link from site i to a site in the $j^{th}$ level, say, j1, has been traversed (i.e., $link_{ij1}$ has been traversed). When a site is initially visited, each of its links to further sites is assigned a depth equal to that of the link that was traversed to reach the site, i.e., $D_{link_{jk}} = D_{link_{ij}}$ for each outgoing link (jk; for this example, links j1k1 and j1k2); this is shown in step S1. In step S2, filter 11 makes a determination as to whether or not the site visited (in this example, j1) is relevant. If so, the process goes to step S7, where the depths of all outgoing links from the site are reset to zero (i.e., in the ongoing example, step S7 would set $D_{link_{j1k1}}=0$ and $D_{link_{j1k2}}=0$). The process then traverses a link to the next level S8 (e.g., from j1 to k1); in so doing, the current site (e.g., j1) will next be considered to be the previous site (that is, i becomes j1), and the next site (e.g., k1) will be considered to be the current site (that is, j becomes k1). From here, the process returns to step S1. If step S2 determines that the current site (e.g., j1) is not relevant, then step S3 increments $D_{link_{jk}}$ for all outgoing links (in the example, j1k1 and j1k2). The process then proceeds to step S4, where it is determined whether or not $D_{link}$ for the outgoing links from the site exceeds a predetermined maximum value, $D_{max}$. If $D_{link_{jk}} > D_{max}$, then no sites stemming from that site are visited, and the links from that site are deleted S5; that is, the "branch" ends at that site. If this were the case, then the next site at the same level of the hierarchy (here, j2) would be visited (if there were no such site, then the process would go back to the previous level to determine if there were another site to be visited from there, etc.) S6. In general, depth is monitored for each link traversed, until it is determined that at least one link from the original site leads to at least one relevant site (i.e., within a depth of no more than $D_{max}$; if this never happens, then all links from the site are deleted).

To understand this process more fully, consider the following additional example, where $D_{max}$ is assumed to be two:

1. A page A contains a link to the page B. Page A is deemed relevant, so the link to B has depth 0.

2. B has a link to C. B is deemed not relevant, so the link to C is assigned the depth 1.

3. C has a link to D. C is deemed not relevant, so the link to page D is assigned the depth 2.

4. D has a link to E. D is deemed relevant, so the link to page E is assigned the depth 0.

5. Note that if D had been deemed not relevant, the link to page E would have been assigned the depth 3, which is greater than $D_{max}$. In this case, the link from D to E would have been deleted, and it would have been determined if there were another site to be visited from C.

In a more concrete example, suppose there is a link to www.games.com and that the SSSE is geared toward the legal context. It is most likely that www.games.com would be deemed not relevant in a legal context, so all the links from www.games.com to other pages, both on www.games.com and other sites, would have the depth 1. Suppose further that from www.games.com, the smart crawler follows the link to www.games.com/Review_The_Ultimate_Car_Game.html, which has a link to www.joysticks.com, from which there are further links. The link from www.games.com to www.games.com/Review_The_Ultimate_Car_Game.html will be given a depth of 1, and the link from this page to wwwjoysticks.com will be given a depth of 2. If the maximum depth is set to 2, and if the page wwwjoysticks.com is deemed not relevant, the links from wwwjoysticks.com are discarded (again assuming a maximum depth of 2).

Figure 6A:
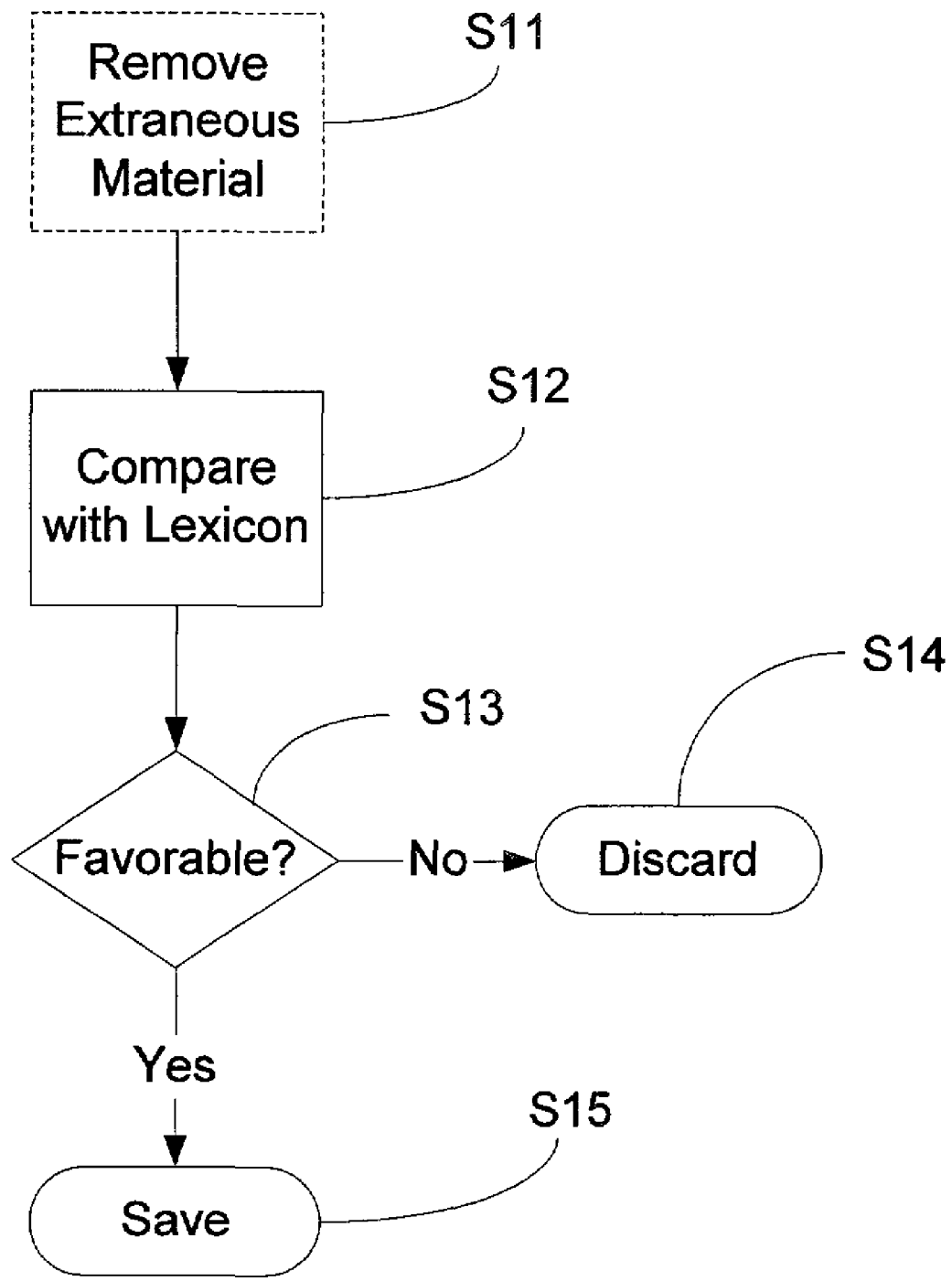
FIGS. 6A, 6B, and 6C illustrate various embodiments of filtering operations according to the present invention.
Figure 6B:
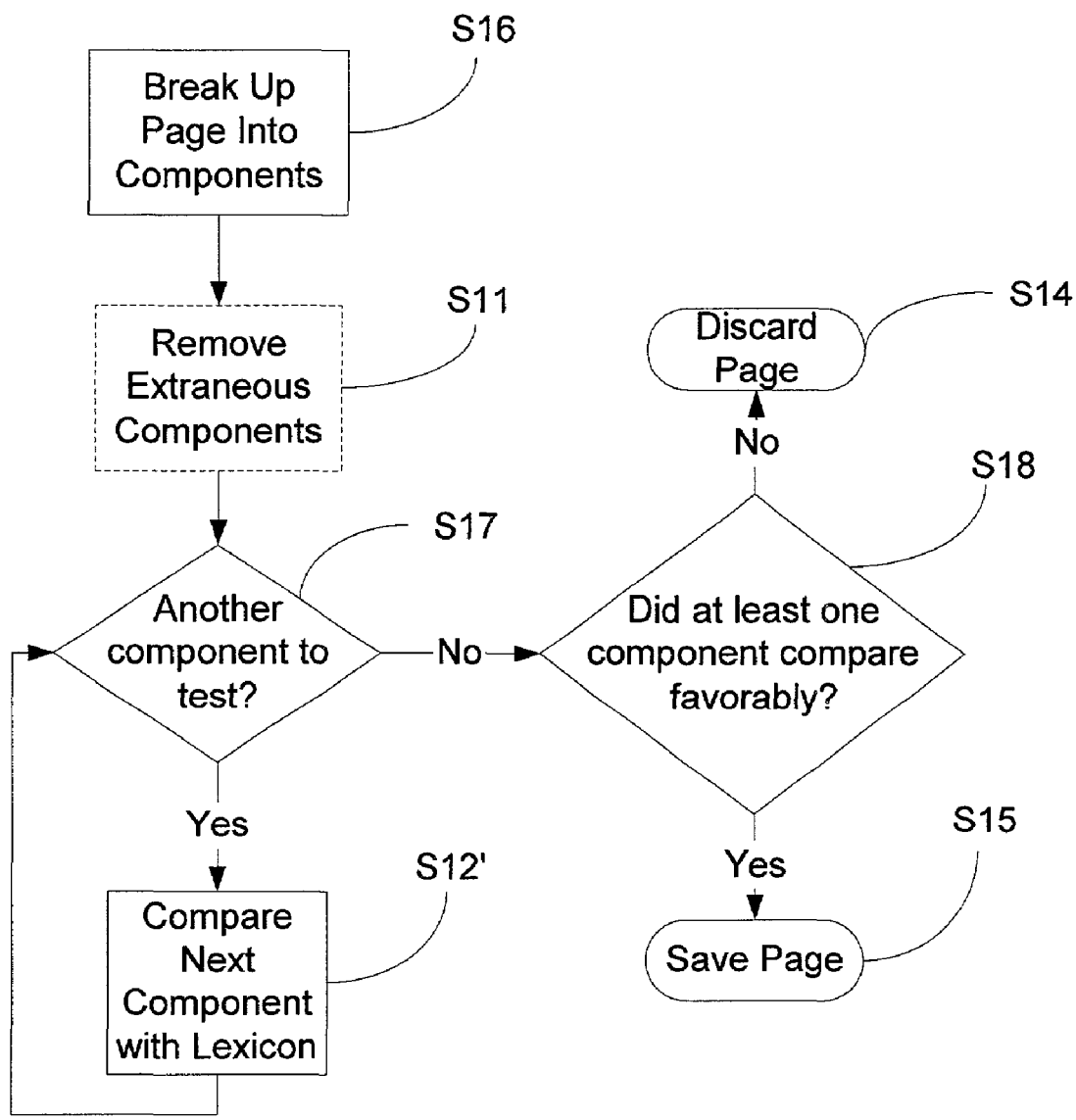
Figure 6C:
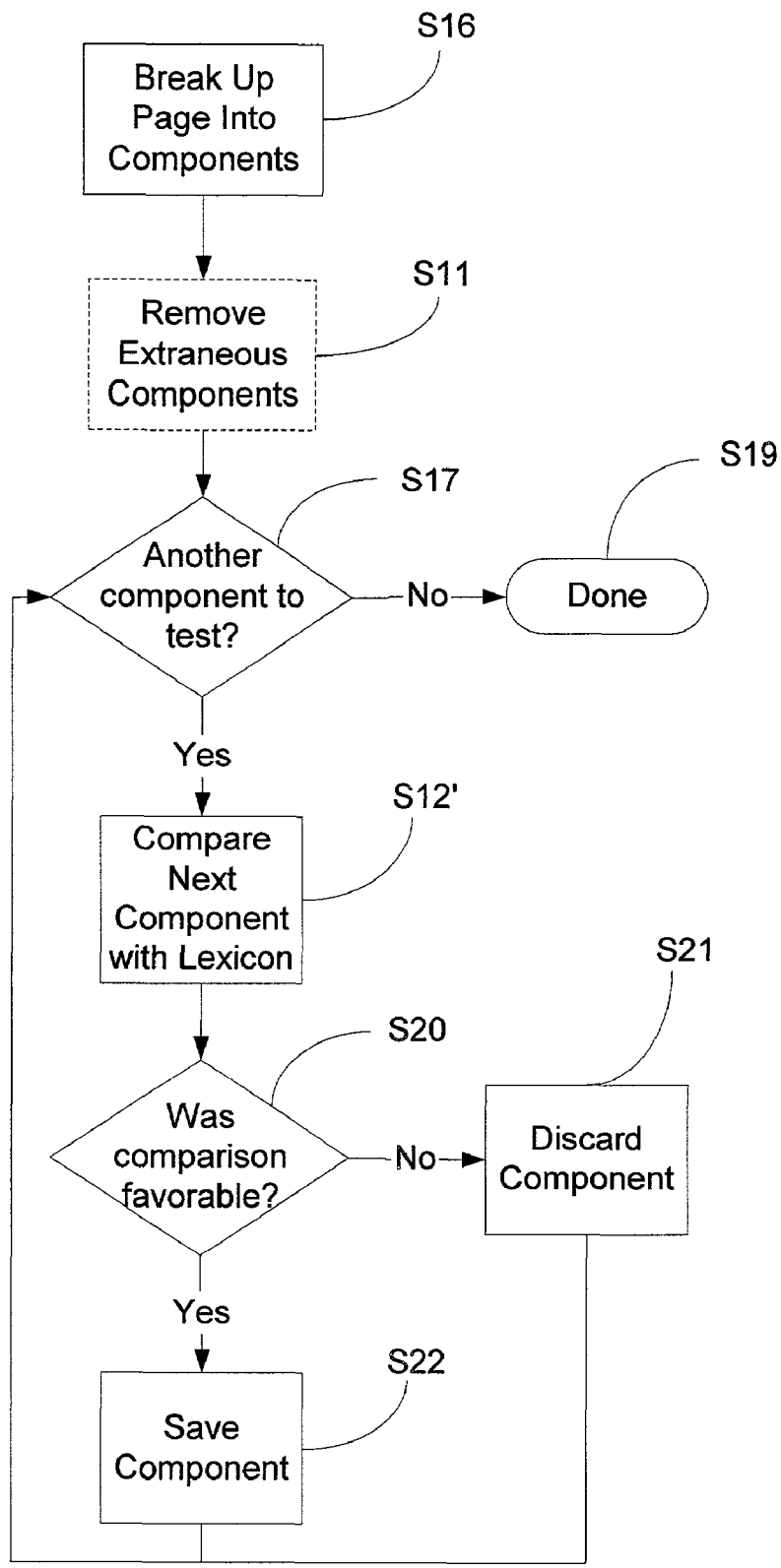

The embodiment of the invention discussed above makes use of at least one automated filter. Exemplary embodiments of automated filtering are depicted in FIGS. 6A-6C FIG. 6A shows the basic idea of the exemplary embodiment of automated filtering according to the invention. A web page is input to the filter, and there is an optional step S1 of removing extraneous material, that is, of recognizing and eliminating from consideration things like advertisements. The main part of the filter takes the page and compares it with a lexicon of terms (e.g., legal terms) S12 whose presence will indicate that the page may be relevant. If the comparison is favorable (this will be discussed further below) S13, then the page is saved S15. If not, then the page is discarded S14.

FIG. 6B shows a second exemplary embodiment of automated filtering. In this embodiment, prior to any analysis, the page under consideration is broken up into component parts (cells) S16. This serves the purpose of making it easier to discriminate between material that needs to be tested and material that is extraneous S11. It also permits a piecemeal approach to testing. The components are passed into a test stage, where first it is determined if there are any remaining components that need to be tested S17. If yes, then the next component is compared with the lexicon S12', and the process loops back to S17. If not, then all components of the page have been tested, and the question is asked as to whether or not there was at least one relevant component on the page S18. If not, then the page is discarded S14. If yes, then the page is saved S15.

FIG. 6C depicts a fully component-oriented exemplary embodiment of automated filtering. As in FIG. 6B, the web page is broken up into its constituent components S16, and extraneous components may be removed S11. The process then determines if there is still a component of the page left to test S17. If not, the process ends S19. Otherwise, the next component is compared with the lexicon S12'. The process then determines if the comparison results are favorable S20. If yes, then the component is saved S22; if not, then it is discarded S21. In this manner, the database that is built by the SSSE need only perform queries on relevant portions of pages, rather than on entire pages that may include irrelevant material.

Figure 7:
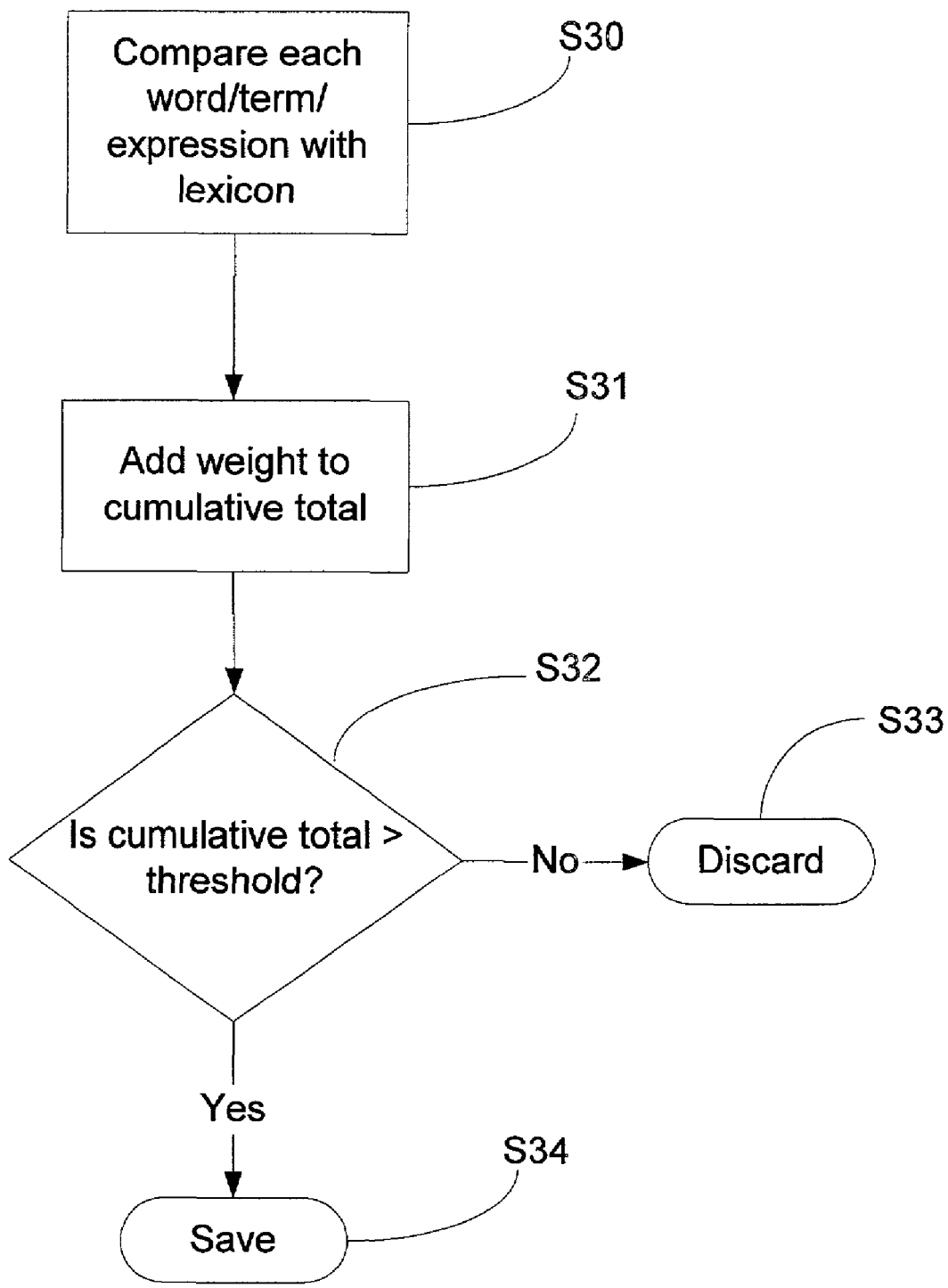
FIG. 7 illustrates an exemplary process used in implementing steps of the embodiments shown in FIGS. 6A, 6B, and 6C.

The above embodiments all include steps of comparing with a lexicon and determining whether or not the comparison was favorable. FIG. 7 depicts an exemplary embodiment of how this may be done. For each object (page or component) to be tested, each word, term, or expression in the object is compared with the words, terms, and expressions found in the lexicon S20. Within the lexicon, different words, terms, and expressions may be assigned different weights, for example, according to relative significance. If it is determined that a word, term, or expression in the object matches one in the lexicon, the weight assigned to the word, term, or expression is added to a cumulative total weight for the object S21. Once the entire object has been tested in this fashion, the cumulative total weight is compared to a predetermined threshold value S22. The value of the threshold may be set according to how selective the SSSE designer wants the database to be. If the cumulative total weight exceeds the threshold, the object is deemed relevant and is saved S24. If not, then the object is deemed irrelevant and is discarded S23.

Also in two of the above embodiments is the step of breaking up a web page into components S16. In an exemplary embodiment, this may be done by splitting up each web page into cells, where a cell is a portion of the page. This is done by analyzing the HTML code for the page. In one embodiment, cells may correspond to paragraphs of text; however, they may correspond to any desired components of the web page (e.g., lines of text or different portions of a page having multiple areas of text). In addition to the advantages of breaking up a web page into its components S11 discussed above, this also makes it easier to remove extraneous material, like menus, banners, etc., leaving only the cells containing material that might contain relevant text.

One particular advantage to using a lexicon-based filter is that all of the components of the filter may be the same for any context/profession, except for the lexicon. Therefore, one need only change the lexicon accessed by the other components in order to create a search engine for a different context/profession. This may be done within the host computer 17 (in FIG. 4) by referencing a different memory for each context/profession. This may, in turn, be done by referencing a different file in a memory (for example, on a hard drive of the host computer) or by replacing a replaceable memory component (for example, a floppy disk or a CD-ROM).

In one embodiment of the invention, an inventive site ranking feature is also included. This ranking system analyzes the Internet (i.e., the sites found) to determine the degree to which sites have been found interesting by others in the desired context/profession. In particular, in one embodiment, this is determined by finding the number of links and citations to sites from other relevant sites determined by a user query. This information may be used in conjunction with displaying the results of the query, in order to emphasize the sites most likely to be helpful.

In a further embodiment of the invention, the site ranking feature is implemented using a word ranking scheme. The basic idea of this technique is to assign numerical scores to words and to sum the scores of the words on a page to determine a score for the page. The technique works by examining each word (non-trivial word, i.e., not "stop words," like "if," "it," "and," and the like) on a given page and increasing its score if it appeared on a relevant page (i.e., a page that passed through filtering) containing a link to the given page. In a sub-embodiment, the word score is increased according to how many relevant pages that linked to the given page contain the word. In a further embodiment, the technique is augmented by increasing a word's score according to where it appears in a link leading to the page being examined. In particular, if the word appears closer in proximity to the link to the page being examined, its score is increased.

A word score is saved for each word on each page (i.e., except for stop words, as discussed above). When a user enters a query, the inventive SSSE determines a set of (relevant) pages that contain the query terms. For each page, the word scores are summed for the words of the query to compute a site ranking for that page. The site rankings for the pages are then used in determining how to display the search results to the user. In summary, the inventive system utilizes dynamic site rankings, computed based on word rankings and in response to user queries.

A further feature according to an embodiment of the invention is a user-friendly display of results. In a preferred embodiment, this user-friendly display is a hierarchical type of display. In a further embodiment, the display uses the site ranking feature to determine an order in which to display the results. That is, the most relevant sites, as determined by their rankings, would be displayed earlier in the display and/or more prominently than less high ranking sites.

Figure 8A:
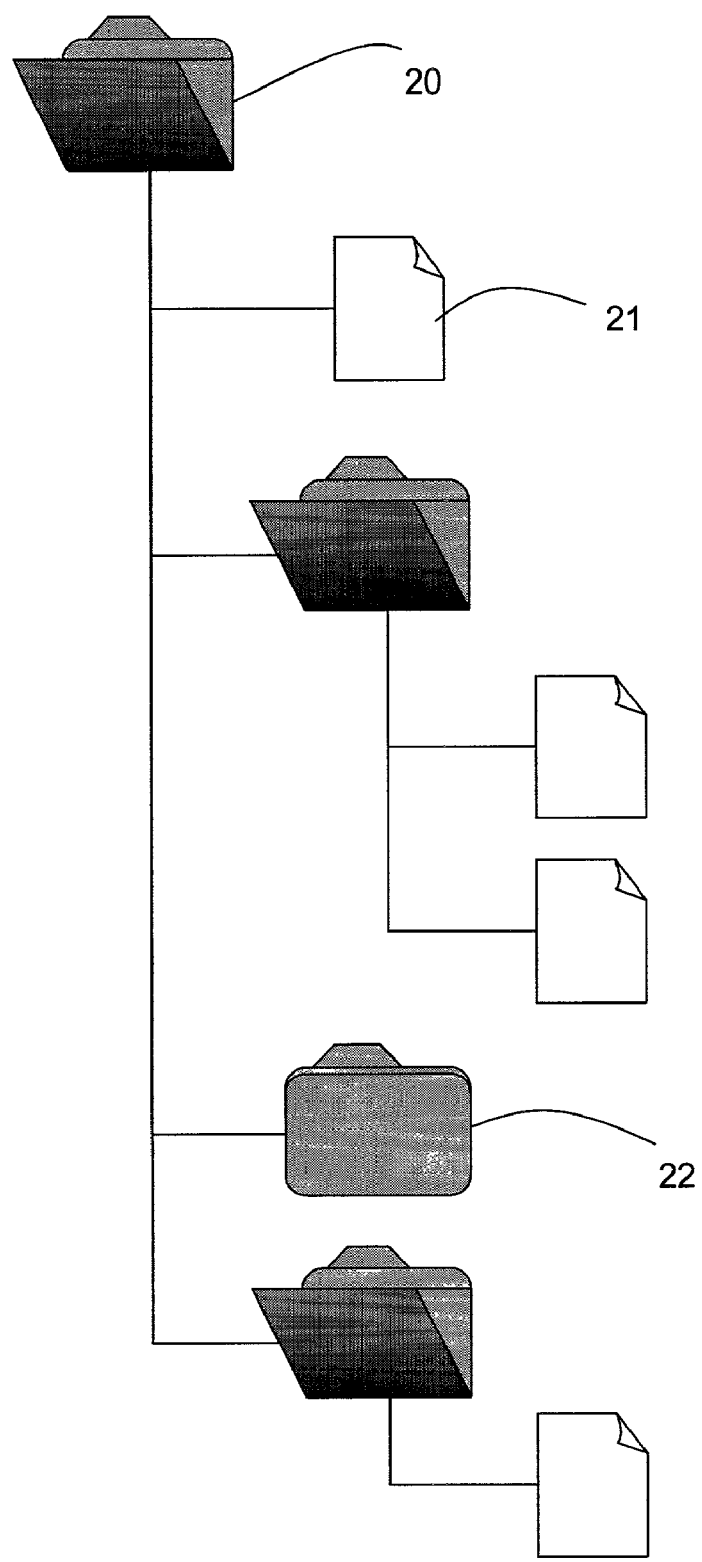
FIGS. 8A and 8B depict exemplary display formats according to embodiments of the invention.
Figure 8B:
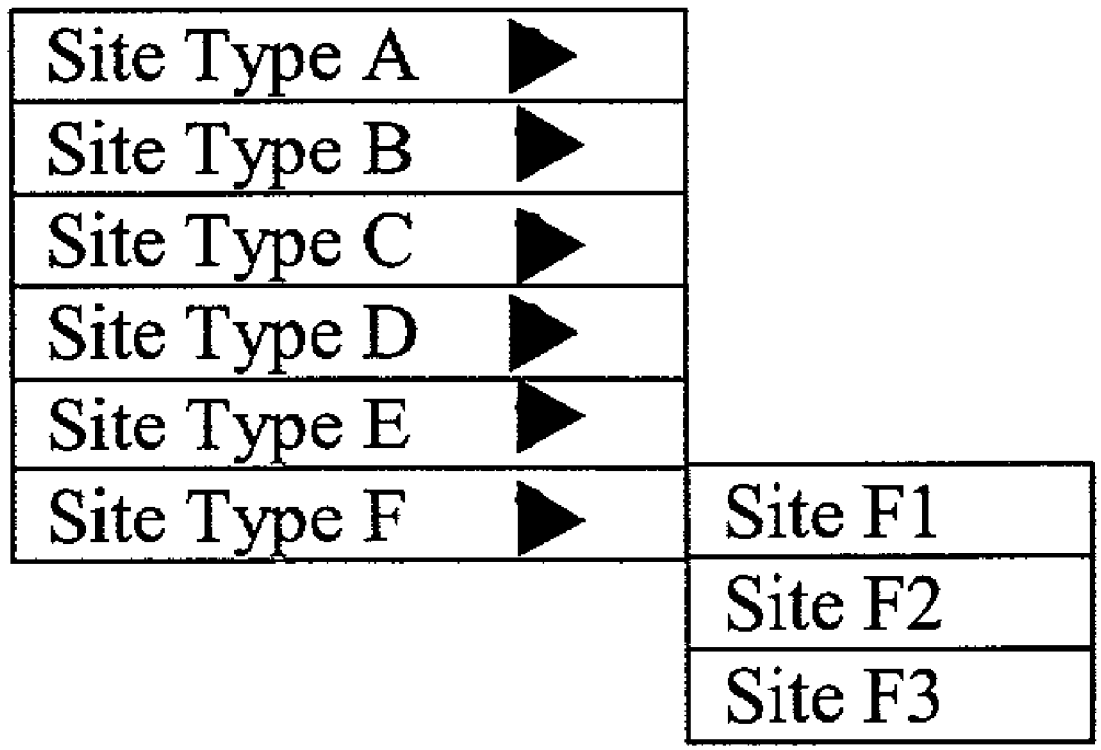

FIGS. 8A and 8B show two exemplary embodiments of a display according to the present invention. FIG. 8A shows a display in the form of a file-document type of hierarchy. A file 20, 22 represents a type of pages/sites that it contains. As shown, the type may contain additional sub-types (shown as files). The type also contains documents, which represent the actual pages/sites. One traverses the hierarchy by clicking on files 20, 22 to open them until one locates a desired document 21. One then clicks on the document 21 to access the information or site.

Similarly, FIG. 8B shows a display in menu form. In the depiction of FIG. 8B, there are six "site types" that represent six different classes of information found during a search of the SSSE database. As in conventional menu-based system, if there is an arrow in the mend, that indicates another level of menu. In the example shown, a user has clicked on Site Type F to reveal three sites (F1, F2, and F3). The user may then access any particular one of these sites by clicking on the appropriate menu item.

In a further embodiment of the invention, the "files" or "site types" in one level of the hierarchy may consist of URLs of sites, and the next level of the hierarchy may then contain "files"/"site types" and "documents"/"sites" linked to from those URLs.

Note that, while the invention has been described above in the context of the Internet, it may be similarly applied to any other computer network.

The inventive procedure is based on the principle that "most pages are not relevant" and that the inventive SSSE should separate the "straw" from the "chaff." This permits the inventive system not to visit every page on the Internet because it can quickly determine that a site is not relevant and, as a result, all the pages on that site are not indexed. One of the consequences of this is that highly irrelevant pages, like most "free home pages," are discarded. Another consequence is that the inventive system builds a fairly large database of relevant material very rapidly.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A computer-implemented method of implementing a subject specific search engine to compile and access subject specific information, associated with a predefined particular subject, from a computer network, the method comprising:

traversing links between websites comprising one or more objects on the computer network, by said search engine, the objects respectively comprising at least one of: one or more web pages comprising the websites; and one or more components comprising any one or more of said web pages, the objects comprising at least one of: words, terms or expressions;

filtering, by said search engine, subject specific content of each said object visited to determine a relevance of said subject specific content thereof to said predefined particular subject, wherein said filtering comprises:

(a) decomposing said objects into one or more said components;

(b) receiving a lexicon, said lexicon comprising subject specific terminology deemed relevant to the predefined particular subject, the subject specific terminology comprising respective words, terms or expressions;

(c) comparing said decomposed components of said objects to said subject specific terminology of the lexicon to determine whether each said object is a subject specific relevant object, wherein said comparing comprises:

(i) assigning a weight to each of said words, terms or expressions comprising the subject specific terminology of the lexicon;

(ii) if a said word, term or expression comprising the object matches a corresponding said word, term or expression comprising the subject specific terminology of the lexicon, adding a corresponding weight thereof to a cumulative total; and (iii) determining any of said objects to be a subject specific relevant object if the cumulative total surpasses a predefined threshold value;

(d) based upon said comparing, determining all objects deemed to be subject specific relevant as objects to be saved;

presenting for an indexing operation at said search engine, each object determined to be subject specific relevant to said particular subject based upon said filtering;

indexing and storing said subject specific relevant objects in a searchable database; and assigning a word score to each word appearing on each subject specific relevant object;

wherein said assigning a word score comprises:

determining all websites found in the database that contain links to the website for each word on the websites, assigning a word score for that word based at least in part on its presence on each website containing a link to the website and increasing the word score for each website containing a link to the website when the word appears in close proximity to the link.

2. The method according to claim 1, wherein element said step (d) further comprises:

discarding all objects determined not to be subject specific relevant based upon said comparing.

3. The method according to claim 1, wherein said filtering occurs prior to said presenting.

4. The method according to claim 1, further comprising:

replacing the lexicon with a lexicon corresponding to a different subject in order to present for said indexing operation a different set of subject specific relevant objects.

5. The method according to claim 1, further comprising:

entering a user query;

using the user query to search the database; and computing a site ranking for each website associated with information found in said searching step, the site ranking being computed based on said word scores.

6. The method according to claim 5, wherein said computing a site ranking comprises:

for each website associated with information found in said searching step, summing the word scores for that website corresponding to words in the user query.

7. A computer-readable storage medium containing software code that, when executed by a processor, causes the processor to execute the method as claimed in claim 1.

8. A system to implement a subject specific search engine for compiling and accessing information relevant to a particular subject from a computer network, the system comprising:

a processor; and the computer-readable storage medium as claimed in claim 7.

9. The method according to claim 1, wherein the filtering further comprises monitoring a depth for each said link, the depth being a reflection of relevance to said predefined particular subject.

10. The method according to claim 9, wherein said monitoring comprises:

for a given said object being visited resulting from said link, setting a said depth of any links leading from said object to other objects to a depth of a link traversed to reach the given object;

wherein said given object is determined to be relevant to said predefined particular subject, setting the depths of the links leading from said object to zero; and wherein said given object is determined not to be relevant to said predefined particular subject, incrementing the depths of the links leading from said object.

11. The method according to claim 10, wherein said monitoring further comprises:

comparing the incremented depths to a predetermined maximum depth value;

wherein when the incremented depths exceed the predetermined maximum depth value, discarding the links leading from said given object;

wherein when the incremented depths do not exceed the predetermined maximum depth value, traversing one of the links leading from said given object.

12. The method according to claim 1, further comprising indexing the totality of objects determined to be subject specific relevant to yield a subcategory of objects.

13. The method according to claim 12, wherein the objects are websites, the computer network comprises the Internet, and the subcategory of objects comprises a portion of the Internet (Internet').

14. The method according to claim 13, further comprising:

permitting a user to enter a query comprising user-preferred words, terms or expressions, wherein the steps of claim 1 are performed in response thereto.

15. The method according to claim 14, further comprising performing a searching operation upon the Internet'.

16. The method according to claim 15, further comprising: displaying information found in said step of searching.

17. The method according to claim 14, further comprising determining a site ranking for each website associated with information found in said searching step.

18. The method according to claim 17, further comprising: displaying the results of the user query using the site ranking of the information found in the searching step to determine an order in which the results are displayed.

19. The method according to claim 17, wherein said displaying the results of the user query comprises: displaying the results of the user query in a hierarchical format according to the site ranking.

20. The method according to claim 18, wherein said assigning word scores further comprises:

assigning a word score to each word on the website based at least in part on how many websites linking to the website also contain the particular word.

21. A subject specific search engine system operable to compile and permit accessing of subject-specific information, associated with a predefined particular subject, from a computer network, the subject specific search engine system comprising:

a memory, connected to a host computer, for storing subject specific relevant objects;

the host computer executing software stored upon a computer-readable storage medium, the software comprising:

a subject specific smart crawler of said search engine traversing links between websites comprising one or more objects on the computer network, the objects respectively comprising at least one of one or more web pages comprising the websites; and one or more components comprising any one or more of said web pages, the objects comprising at least one of: words, terms or expressions;

said subject specific smart crawler performing filtering, of subject specific content of each said object visited to determine a relevance of said subject specific content thereof to said predefined particular subject, wherein said filtering comprises:

(a) decomposing said objects into one or more said components;
(b) receiving a lexicon, said lexicon comprising subject specific terminology deemed relevant to the predefined particular subject, the subject specific terminology comprising respective words, terms or expressions;
(c) comparing said decomposed components of said objects to said subject specific terminology of the lexicon to determine whether each said object is a subject specific relevant object, wherein said comparing comprises:
   (i) assigning a weight to each of said words, terms or expressions comprising the subject specific terminology of the lexicon;
   (ii) if a said word, term or expression comprising the object matches a corresponding said word, term or expression comprising the subject specific terminology of the lexicon, adding a corresponding weight thereof to a cumulative total; and
   (iii) determining any of said objects to be subject specific relevant objects if the cumulative total surpasses a predefined threshold value;
(d) based upon said comparing, determining all objects deemed to be subject specific relevant as objects to be saved;
an indexer of said search engine indexing the plurality of said objects determined to be subject specific relevant to said particular subject based upon said filtering; and
an assigner of said search engine for assigning a word score to each word appearing on each subject specific relevant object:
wherein said assigning a word score comprises:
determining all relevant websites found in memory that contain links to the website:
for each word on the websites, assigning a word score for that word based at least in part on its presence on each website containing a link to the website and increasing the word score for each website containing a link to the website when the word appears in close proximity to the link.

22. The system according to claim 21, wherein said filtering is performed by a first lexicon based filter.

23. The system according to claim 22, wherein the lexicon is stored on an interchangeable computer-readable storage medium.

24. The system according to claim 22, further comprising at least a second filter performing one or more operations of the first filter.

25. The system according to claim 21, wherein the system further comprises a human-computer interface, and comprises:
a device for presenting said subject specific relevant objects received from the smart crawler to a human editor via the human-computer interface; and
a device for receiving input from the human editor, entered via the human-computer interface, regarding whether to index and store said subject specific relevant objects in the memory.

26. A computer-implemented method of implementing a subject specific search engine to compile and access subject specific information, associated with a predefined particular subject, from a computer network, the method comprising:
traversing links between websites comprising one or more objects on the computer network, by said search engine, the objects respectively comprising at least one of: one or more web pages comprising the websites; and one or components comprising any one or more of said web pages, the objects comprising at least one of: words, terms or expressions;
filtering, by said search engine, subject specific content of each said object visited to determine relevance of said subject specific content thereof to said predefined particular subject, wherein said filtering comprises:
   (a) decomposing said objects into one or more said components;
   (b) receiving a lexicon, said lexicon comprising subject specific terminology deemed relevant to the predefined particular subject, the subject specific terminology comprising respective words, terms or expressions;
   (c) comparing said decomposed components of said objects to said subject specific terminology of the lexicon to determine whether each said object is a subject specific relevant object, wherein said comparing comprises:
      (i) assigning a weight to each of said words, terms or expressions comprising the subject specific terminology of the lexicon;
      (ii) if a said word, term or expression comprising the object matches a corresponding said word, term or expression comprising the subject specific terminology of the lexicon, adding a corresponding weight thereof to a cumulative total; and
      (iii) determining any of said objects to be a subject specific relevant object if the cumulative total surpasses a predefined threshold value
   (d) based upon said comparing, determining all objects deemed to be subject specific relevant as objects to be passed to a second filter, wherein said second filter comprises:
      (aa) presenting one or more of said components of each of said objects to a human editor via a human computer interface;
      (bb) permitting the human editor to deem a said object to be a subject specific relevant object if the human editor determines any of said components comprising said object to be within said predefined particular subject;
      (cc) permitting the human editor to deem a said object to not be a subject specific relevant object if the human editor determines any of said components comprising said object to not be within said predefined particular subject; and
      (dd) based upon said (bb) and (cc), determining all objects deemed to be subject specific relevant as objects to be saved;
presenting for an indexing operation at said search engine, each object determined to be subject specific relevant to said predefined particular subject based upon said filtering.

* * * * *